United States Patent [19]

Richardson et al.

[11] Patent Number: 5,037,350

[45] Date of Patent: Aug. 6, 1991

[54] METHOD AND APPARATUS FOR FORMING MEAT PATTIES HAVING A CLOSER-TO-HANDFORMED APPEARANCE AND TEXTURE

[75] Inventors: Robert E. Richardson, Rocky Mount; Philip P. Sabin, Nashville, N.C.

[73] Assignee: Hardee's Food Systems, Inc., Rocky Mount, N.C.

[21] Appl. No.: 681,663

[22] Filed: Dec. 14, 1984

[51] Int. Cl.$^5$ ................................................ A22C 7/00
[52] U.S. Cl. .................................... 452/174; 426/518; 83/326
[58] Field of Search .............. 17/32; 426/518; 83/326; 452/174

[56] References Cited

U.S. PATENT DOCUMENTS

| | | |
|---|---|---|
| 968,110 | 8/1910 | Barbieri . |
| 1,726,938 | 9/1929 | Ward et al. . |
| 2,023,291 | 12/1935 | Roth ................................ 83/326 X |
| 2,203,318 | 6/1940 | Yerk . |
| 2,539,232 | 1/1951 | Dempster . |
| 2,613,618 | 10/1952 | Sharp et al. ..................... 83/326 X |
| 2,756,459 | 7/1956 | Kellner . |
| 3,154,986 | 11/1964 | Reid ................................ 83/326 X |
| 3,347,176 | 10/1967 | Hall . |
| 3,436,927 | 4/1969 | Gruber . |
| 3,887,719 | 6/1975 | Miller . |
| 4,068,008 | 1/1978 | Orchard . |
| 4,138,768 | 2/1979 | Roth ....................................... 17/32 |
| 4,192,899 | 3/1980 | Roth . |
| 4,195,489 | 4/1980 | Bernard ........................... 83/326 X |
| 4,205,415 | 6/1980 | Orchard . |
| 4,229,859 | 10/1980 | Gagliardi, Jr. et al. ............ 17/32 X |
| 4,239,785 | 12/1980 | Roth . |
| 4,272,864 | 6/1981 | Holly ...................................... 17/45 |
| 4,338,702 | 7/1982 | Holly ...................................... 17/32 |
| 4,349,575 | 9/1982 | Roth . |
| 4,467,497 | 8/1984 | Peterson et al. ..................... 17/32 X |

OTHER PUBLICATIONS

Packaging Research Corporation, advertisement for Versaform forming maching, four pages.
Formax, Inc., advertisement for Formax 26, five pages.
Hollymatic Corporation, advertisement for Hollymatic 880, one page.
Pemberton Boldt, Inc., advertisement for Boldt Former, one page.
Pembertons Food Processing Equipment, Inc., advertisement for VM-400, six pages.

*Primary Examiner*—Willis Little
*Attorney, Agent, or Firm*—Cushman, Darby & Cushman

[57] ABSTRACT

Ground beef at 28°-31° F. ground to pass through 3/32-⅛ inch grinder outlet openings is spread laterally and sheeted on a moving conveyor belt to a desired patty thickness with minimum pressure and working. The sheet passes under an endless track of transversally extending bars having a pattern of hexagonal cells cooperatively formed in their outer faces. The bars are mounted to chains which are entrained about sprockets that are driven to match the surface speed of the sheet conveyor. Intermediate the longitudinal extent of the lower run of the track of cutter bars, the cutters are gradually cammed down to abutment with the sheet conveyor, and gradually out of the sheet. At the downstream end, the hexagonal patties move over a fluidized bed-type transfer plate onto a take away conveyor, e.g. into a blast freezer, as a narrow selvage at both lateral margins drop away for recycling. As the patties are cooked, they become approximately if not perfectly round, displaying an appearance and texture more like hamburgers from homemade, handformed meat patties.

18 Claims, 7 Drawing Sheets

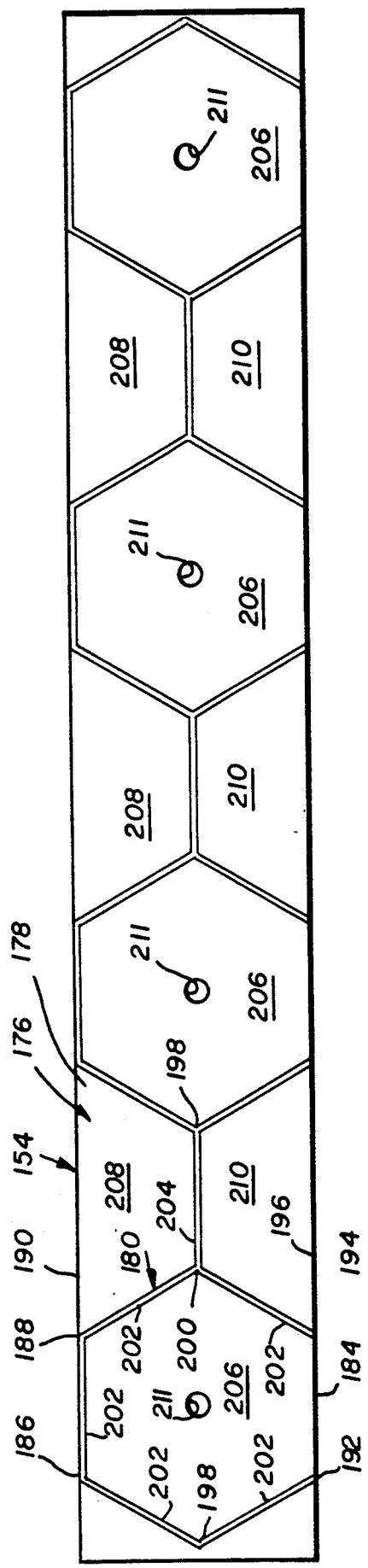

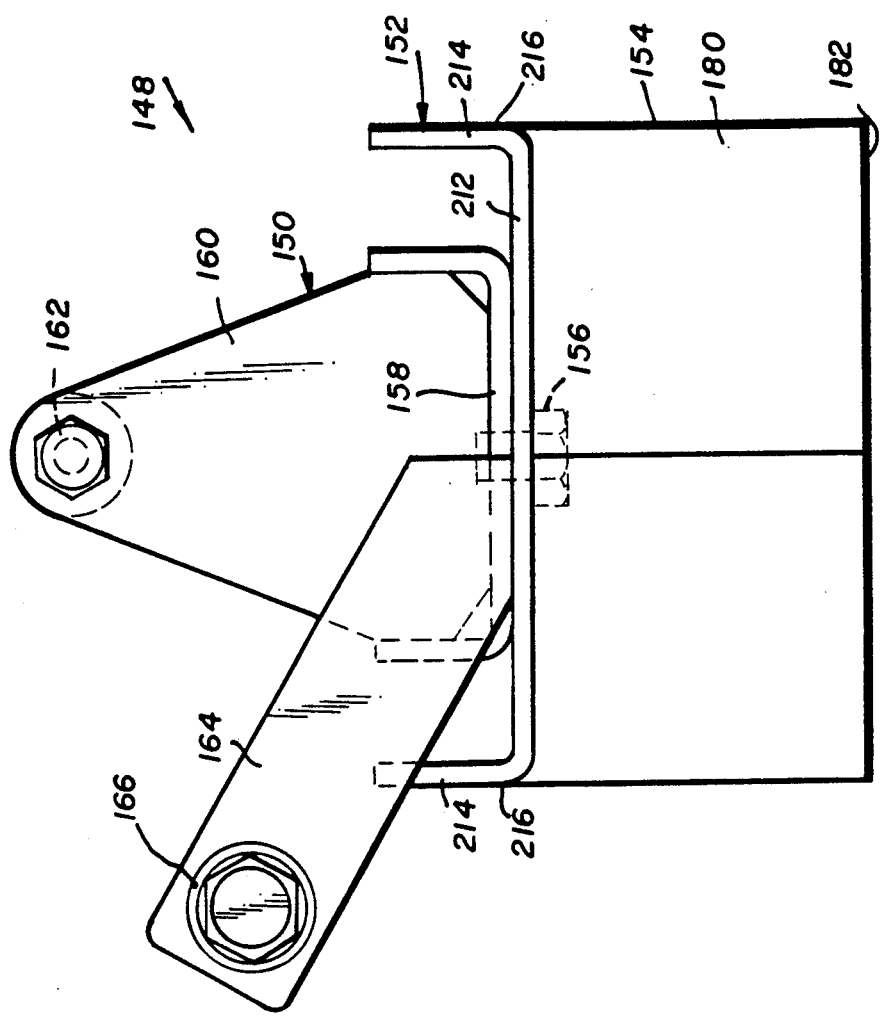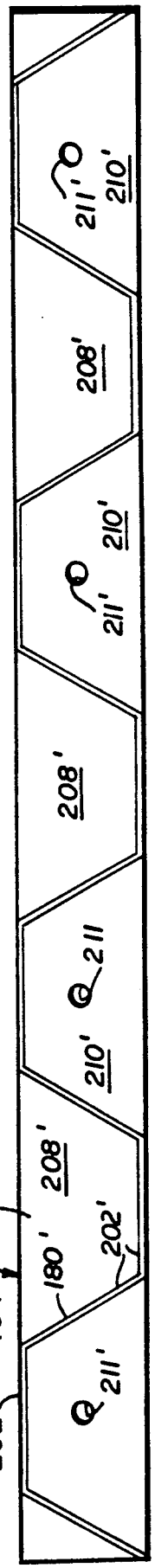

METHOD AND APPARATUS FOR FORMING MEAT PATTIES HAVING A CLOSER-TO-HANDFORMED APPEARANCE AND TEXTURE

BACKGROUND OF THE INVENTION

For forming and portioning hamburgers, other ground meat, fish, vegetables e.g., in the commissaries, plants and kitchens of food processors, airline and institutional food service companies, fast food restaurant franchisors and other suppliers and the like, methods and apparatus have been developed and placed in widespread use, which concentrate upon ruggedness, reliability, ease of cleaning and rather precise portion control, at the expense of turning out portions which are so dense and uniform in appearance that much of their relationship to the appearance and texture of the comparable homemade or hand formed product is lost.

To some, such standardized, dense, highly-worked food products suggest the appearance, if not the taste, of hockey pucks.

Typically, such uniformly dense, uniformly shaped patty products are formed by squeezing a column of very cold ground meat into a slotted plate that is slidably mounted in a confined space, then sliding the plate to a second position in which the patty or patties can be displaced from the slot or slots onto a moving conveyor belt.

Up to a point, the forming characteristics of such a machine are improved by lowering the temperature of the ground meat. However, as colder meat is run, generally the pressure on the meat must be increased, e.g. from 150 psi up to 600 psi, in order to ensure filling the slots in the slotted plate. The capability of using higher pressure not only requires the conventional machines to be ruggedly built, but also to need heavy duty electrical service, e.g. a 50 amp/460 volt/3 phase power line. The more severely that a material such as ground beef is caused to flow under pressure, the more proteinaceous juice is expressed from the patties causing a decline in the juiciness, and perhaps in the nutritional quality of the patty, upon cooking.

With the passage of time and the gaining of experience with the conventional machinery, certain adjuncts to the patty-forming process have become fairly standardized throughout the industry. For instance, the conveyor belt width running from where the patties are deposited, into and through the blast freezer to a packing line generally lies in the range of 24–30 inches. Meat grinding machines in most widespread use, e.g. made by Wolfking, Weiler, Hobart or Butcher Boy, generally provide a column of ground meat which is 8–14 inches in diameter (ten inches in diameter being most common), in which the ground meat has been forced through a grid of openings which are each 2.5 mm (3/32 inch) in diameter, although some conventional processes can use more roughly cut meat, e.g. which has been forced through 3.2 mm (⅛ inch) holes. Where the input capacity of a patty former is not matched one-to-one with a grinder, it is known in the art to feed more than one patty former using one grinder or to serve a patty former with more than one grinder, e.g. one serving two, three serving two, etc.

Most cryogenic freezers in widespread use have a design capacity of about 3,200 pounds of ground meat per hour, where the input is at approximately 31°–32° F. and the output is at approximately 5° F. In practice, the freezer serving a patty former often is the limiting factor on throughput of the line. Thus, down to a point where the ground meat is too stiff to be formed on the patty former, the effective capacity of the line can be increased by using colder ground meat as input. For most slotted plate-type hydraulic formers, 31 degrees is about the coldest ground meat can be and still be formed satisfactorily.

An advantage that slotted plate-type hydraulic formers have over some competing patty formers is the ability to form circular or oval patties that, after being cooked, cover a bun more neatly, yet without producing an excess of inter-patty scrap for recycling at the patty forming station.

There are, or have been commercially offered patty formers where the ground meat is sheeted on a conveyor belt, then stamped cookie cutter-fashion, but such machines do suffer in comparison because of the inter-patty scrap that they produce (and because of the problems associated with maintaining properly coordinated timing for the stampers relative to the conveyor belt on which the sheeted meat is moving).

There also are or have been commercially offered patty formers where the ground meat is sheeted on a conveyor belt then slit longitudinally into ribbons and cut crosswise, e.g. by a rotating wheel with transverse cutter bars projecting on its periphery. This avoids inter-patty scrap, but at the cost of producing patties which are either square or rectangular. In actual consumer panel preference testing known to the present inventors, a strong lack of preference for hamburgers in such shapes is almost universally expressed. And poor bun coverage results, where the hamburger bun is traditionally circular in plan outline, either the corners of the square hamburger stick out, or else there are four D-shaped areas about the bun perimeter where there is no meat between the top and bottom halves of the bun. Accordingly, for many processors, use of such equipment is totally impractical.

In the biscuit making industry, it has been known to sheet dough onto a horizontal conveyor belt and to run a cutter wheel in engaging relation with the upper face of the conveyor belt, with the cutter wheel being provided with a honeycomb (completely ordered hexagonal) endless pattern of cutters on its outer peripheral surface. There are two basic reasons why such a cutter works well with biscuit dough but would be impractical to use with sheeted ground meat.

First, when the dough is cut in such a manner, the sheet of dough is comparatively thin. There is not much thickness of sheet for the cutters to clear as they enter and leave the dough, so scarring is minimal. The individual cut hexagonal biscuit blanks are allowed to proof after cutting has been accomplished. Minor scarring is obliterated as the biscuit blanks rise. With sheeted meat, the sheet is comparatively thicker, i.e. substantially the thickness of the desired patty, there being no possibility of using a leavening agent to cause the meat patties to gain in thickness after they have been cut.

Second, while it is permissible and a widespread practice in biscuit making to dust the dough blanks with a coating of vegetable oil and coarse flour which, in addition to aiding in sealing against leavening gas loss and preventing biscuit-to-can and biscuit-to-biscuit sticking, also acts as a cosmetic to further obscure any minor scarring that was caused by the entry and exit of the cutting elements on the rotary cutter wheel. However when making ground meat patties, dusting with a particulate cereal-based material would hardly produce a sufficient cosmetic effect, unless it were applied to such a thickness as to constitute a breading, and, in any event, the addition of a cereal to an all meat product would require advertising and labeling changes that would place the food seller at a competitive disadvantage. (Competitors with all-meat products would not fail to make the point that the other product had been extended with a cereal-based filler, and therefore was of lower quality.)

SUMMARY OF THE INVENTION

Ground beef at 28°–31° F. ground to pass through 3/32-⅛ inch grinder outlet openings is spread laterally and sheeted on a moving conveyor belt to a desired patty thickness with minimum pressure and working. The sheet passes under an endless track of transversally extending bars having a pattern of hexagonal cells cooperatively formed in their outer faces. The bars are mounted to chains which are entrained about sprockets that are driven to match the surface speed of the sheet conveyor. Intermediate the longitudinal extent of the lower run of the track of cutter bars, the cutters are gradually cammed down to abutment with the sheet conveyor, and gradually out of the sheet. At the downstream end, the hexagonal patties move over a fluidized bed-type transfer plate onto a take away conveyor, e.g. into a blast freezer, as a narrow selvage at both lateral margins drop away for recycling. As the patties are cooked, they become approximately if not perfectly round, displaying an appearance and texture more like hamburgers from homemade, handformed meat patties.

The principles of the invention will be further discussed with reference to the drawings wherein preferred embodiments are shown. The specifics illustrated in the drawings are intended to exemplify, rather than limit, aspects of the invention as defined in the claims.

BRIEF DESCRIPTION OF THE DRAWINGS

IN THE DRAWINGS

Figure 1:
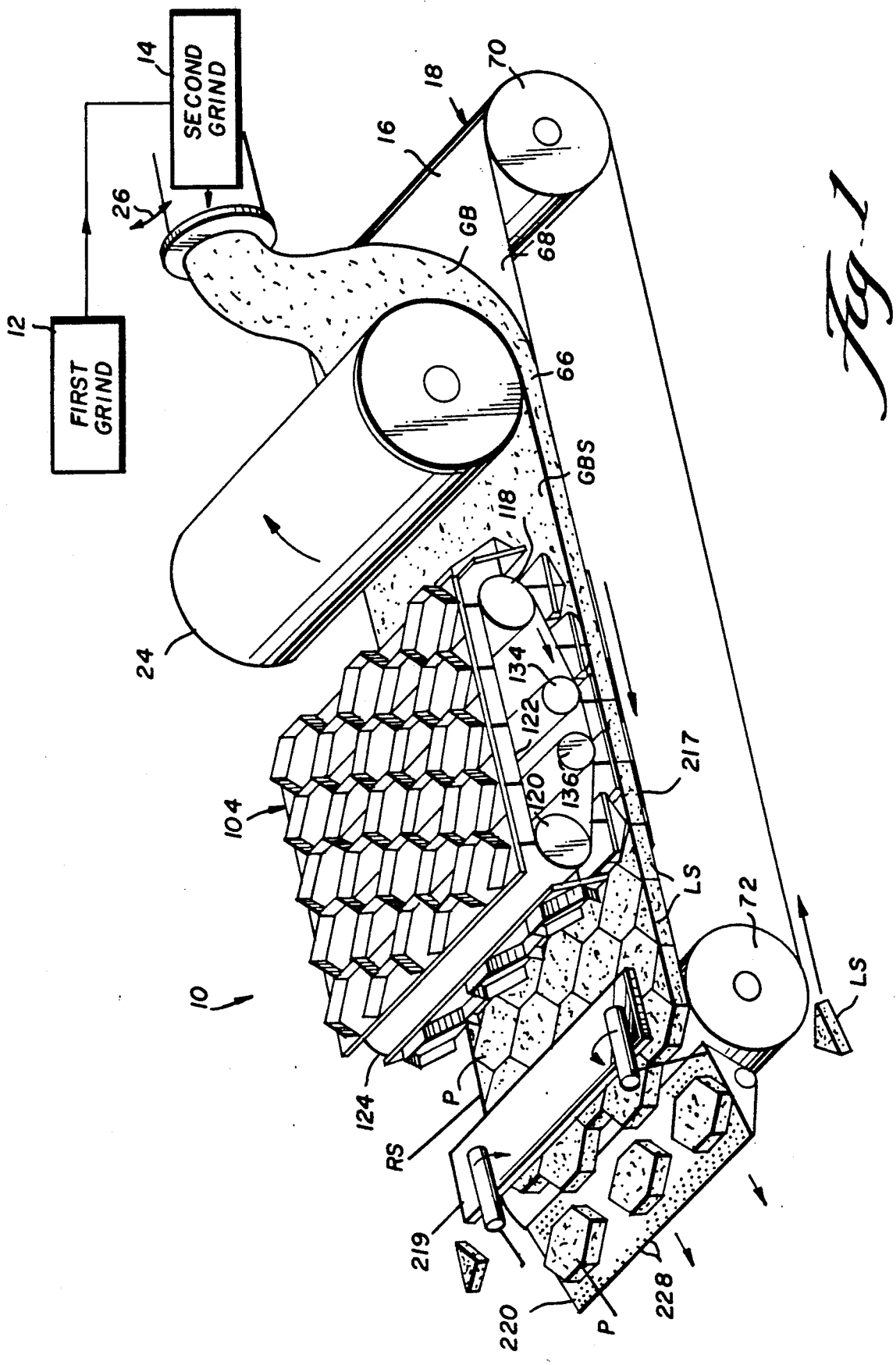
Figure 2:
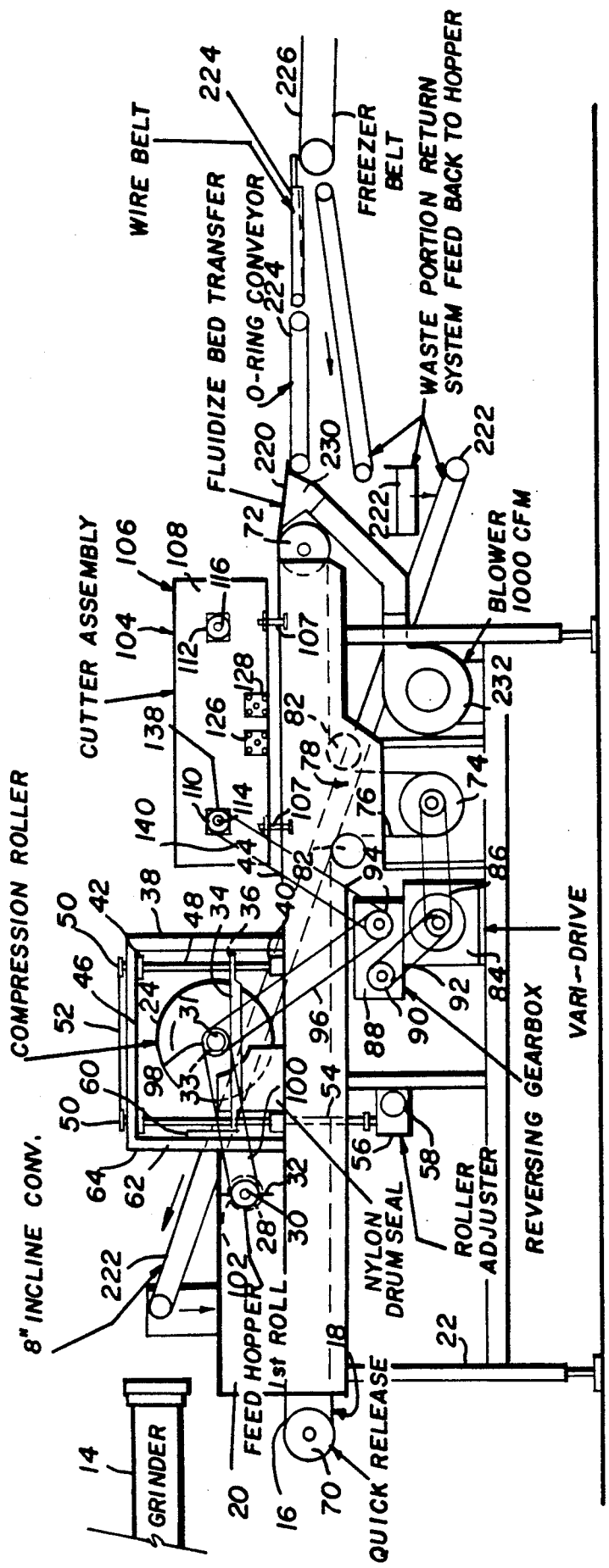
Figure 3:
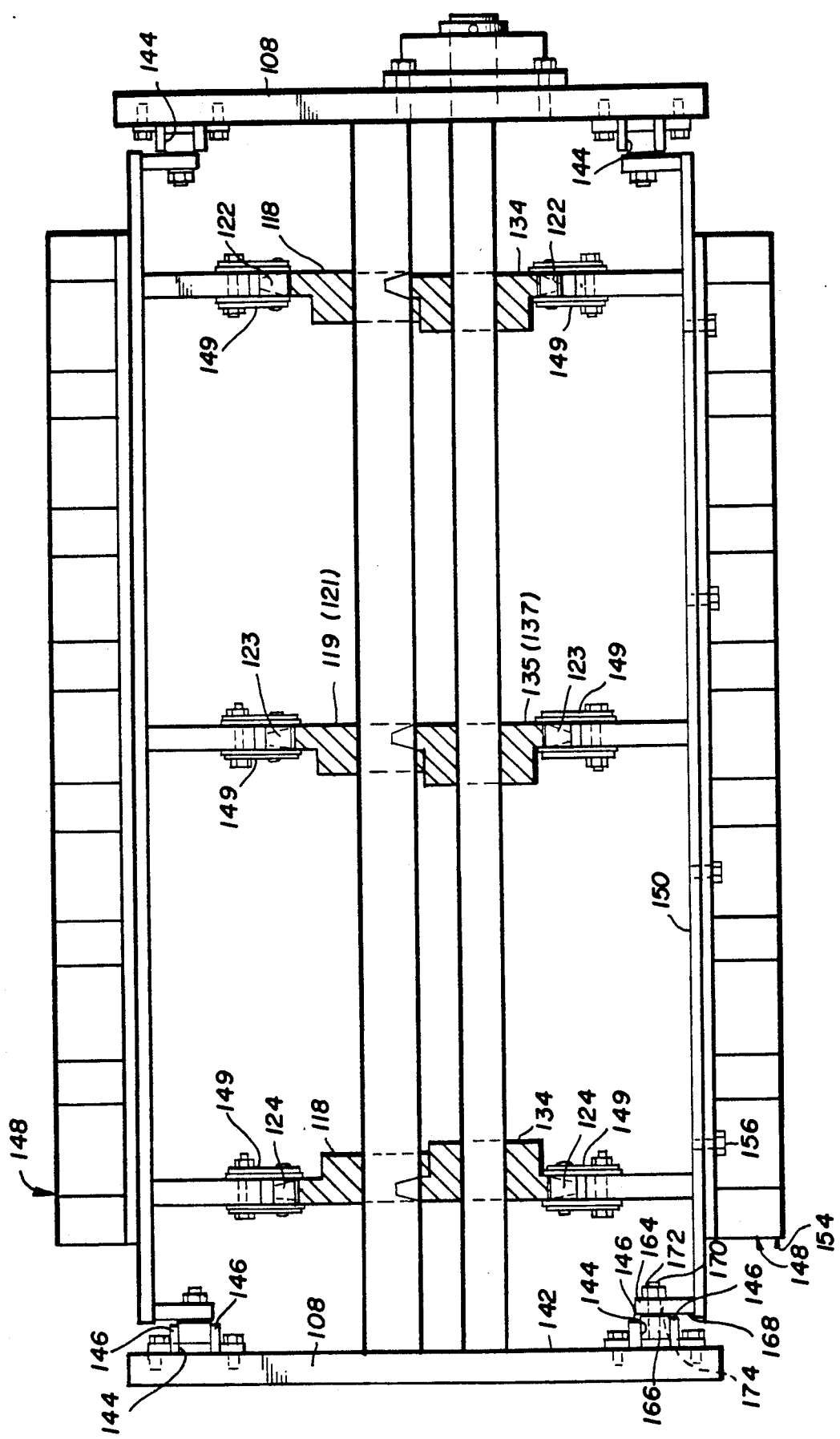
Figure 4:
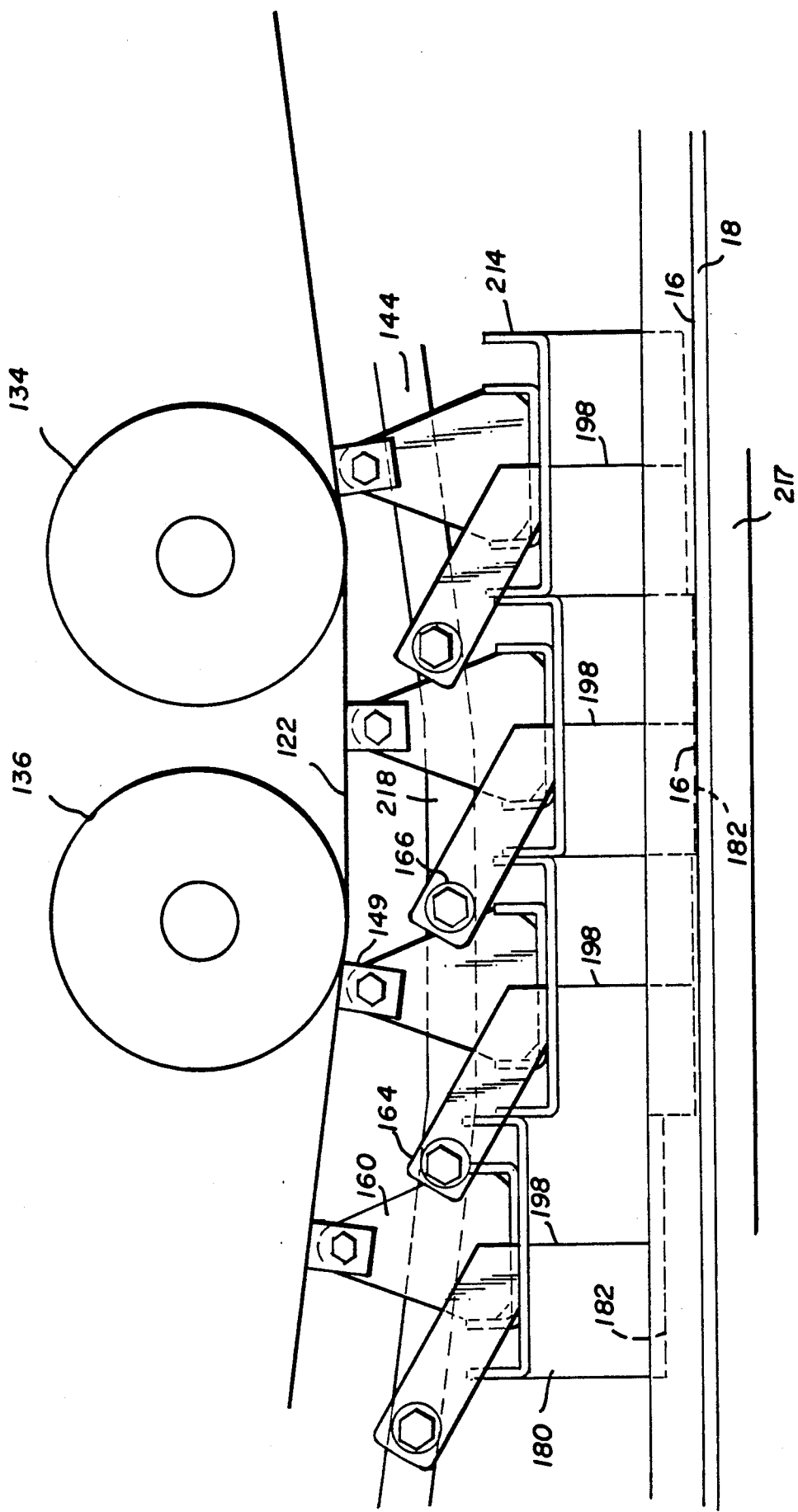
Figure 5:
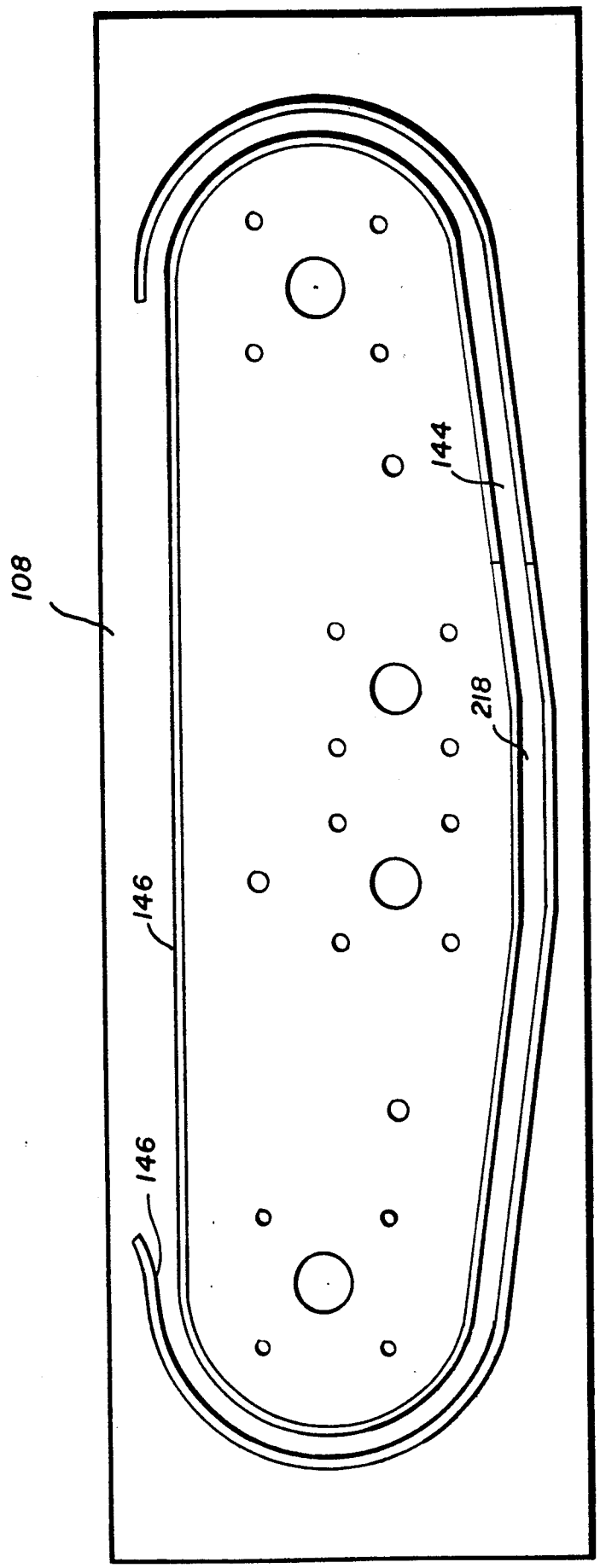

FIG. 1 is a schematic perspective view of patty forming apparatus embodying principles of the present invention;

FIG. 2 is a side elevational view thereof, looking at the opposite side, and showing some additional structural details;

FIG. 3 is a fragmentary vertical transverse sectional view at the cutting station taken substantially along line 3—3 of FIG. 2;

FIG. 4 is a somewhat schematic fragmentary side elevation view of the cutting station, with the near side plate shown as if transparent in order to expose details otherwise obscured;

FIG. 5 is a smaller scale inner side elevation view of one of the side plates showing the cam track;

FIG. 6 is a bottom plan view of one preferred form of cutter bar;

FIG. 7 is an end elevation view thereof; and

FIG. 8 is a bottom plan view of another preferred form of the cutter bar.

DETAILED DESCRIPTION

A schematic representation of a preferred embodiment of the meat patty forming apparatus and process of the invention is illustrated at 10 in FIG. 1.

Upstream of the newly-designed apparatus, meat, e.g. boneless beef at industry standard approximately 22–23 weight percent fat content and at 28°–31° F. is ground, typically in a conventional two-stage grinder 12, 14 to pass through an outlet plate provided with a circular pattern of holes of approximately 2.5–3.2 mm (3/32-⅛ inch) diameter to provide a column of ground meat, e.g. about ten inches in diameter.

The output of the terminal stage 14 of the grinder is oriented to debouch onto the upstream end of the upper horizontal run 16 of an endless conveyor belt 18. (illustrated in FIG. 2, peripheral wall means 20 defining an upwardly open hopper may be provided on the frame 22 of the apparatus 10 at the site where the ground meat is deposited on the conveyor, in order to provide an impoundment for temporary excess of supply, accommodate variations in amount of supply, to prevent loss of ground meat over the sides and leading end of the conveyor belt, and to begin to define the opposite lateral margins of the sheet of ground meat GBS.

Element 24 is the primary compression roller which serves the purpose of sufficiently compacting the ground meat to permit it to be formed into patties that can be cut, (possibly frozen, packed, stored, transported and thawed) and cooked, without needing substantial further compaction in order to remain sufficiently consolidated to avoid undue breakage and loss of fragments. Compression roller 24 also serves to provide the sheet of ground meat GBS with a selected uniform thickness and a full width, and to prevent any temporary excess of ground meat deposited by the grinder 14 in the hopper 20 from being conveyed from the hopper until needed for making-up the full thickness and width of the sheet of ground meat GBS.

Generally, some added effort must be made to laterally spread the output GB of the grinder 14 which typically is a loose circularly cylindrical collection of individual longitudinal strands or strings of ground meat, before that output encounters the primary compression roller 24. Otherwise the task of lateral spreading and vertical pushing down needed would be too great to be accomplished by one roller acting down against the supply GB moving under it on the conveyor belt run 16, unless unacceptably harsh measures were taken, e.g. by placing such a deep herringbone pattern on the roller 24 that the sheet of ground meat would locally stick to the roller and have holes torn in it, not be able to be neatly separated from the roller by scraping, be of non-uniform thickness where the cleats of the herringbone pattern made depressions in it, and be unacceptably worked with attendant loss of a relatively high amount of noticeable parallelism of the ground meat strands in the patties ultimately produced.

There are at least two ways that the needed extra effort to laterally spread the output GB on the conveyor belt run 16 upstream of the primary compression roller 24:

According to a first alternative, the output head of the grinder 14 may be pivotally mounted, e.g. so that it continually arcuately reciprocates about a vertical axis in the direction of arrows 26 (FIG. 1), in such a manner as to sinuously lay down the supply GB across much of the width of the conveyor belt run 16. The output head of the grinder 14 may be manually swivelled to accomplish that purpose, or any convenient automated reciprocating mechanism may be provided.

According to a second alternative (which may be used instead of or together with the first), the feed hopper 20 is provided with at least one preliminary compression roller 28 (FIG. 2) located downstream of where the supply GB becomes deposited on the belt run 16 in the hopper 20, but upstream of the primary compression roller 24.

As shown, the preliminary compression roller 28 includes axles 30 mounted in vertically elongated bearing slots 32 in the left and right sidewalls of the hopper 20. The slots 32 define the upper and lower extremes of vertical movement of the roller 28. Generally, the weight of the roller 28 bears down on the supply GB passing under it on the conveyor belt run 16, and this serves to provide a first stage flattening and broadening of the supply GB to begin to form the sheet GBS.

Although the roller 28 could be free-running, by preference, it is power-rotated in relation to rotation of the primary compression roller 24 as is further described below. Instead of riding up and down in slots 32, the roller 28 could be journalled to rotate at a fixed or adjustably-fixed height above the upper conveyor belt run 16.

The primary compression roller 24 is shown having trunnions 31 journalled in bearings 33 which are mounted on two beams 34. The beams 34 are shown being horizontally oriented longitudinally of the conveyor run 16 and to each be provided near its heading and trailing ends with a vertically-oriented helically threaded opening 36. The machine frame 22 is shown provided at its opposite lateral margins at the site of the primary compression roller with two arch-like yoke portions 38. At each margin a leading and a trailing set of vertically aligned bearings, e.g. a lower, thrust bearing 40 and an upper sleeve bearing 42 are provided, the former on a longitudinal member 44 of the frame laterally outside the path of the conveyor belt 18, and the latter in the upper horizontal member 46 of the yoke portion 38. A lead screw 48 is mounted in each set of bearings 40, 42 for rotation about a respective vertical axis each threaded through a corresponding opening 36 in a respective one of the beams 34. Above where each lead screw projects through the respective member 46, a sprocket 50 is fixed thereon. A timing chain 52 is entrained about all four sprockets 50, so that as one lead screw 48 is rotated through a certain angle in either angular sense, the others are correspondingly rotated thus correspondingly raising or lowering the primary compression roller 24 relative to the upper horizontal run 16 of the conveyor belt 18 while maintaining the substantially transverse, horizontal disposition of the rotation axis of the primary compression roller 24.

In the instance depicted, a means for adjusting the height of the roller 24 is provided by having one of the lead screws 48 extend through its lower support bearing at 54 and therebelow be operatively connected to an adjuster 56 of a conventional type. Rotation of the hand wheel 58 in one angular sense thus causes the lead screws 48 to rotate a corresponding amount in one angular sense to raise the roller 24, and rotation of the handwheel 58 in the opposite angular sense thus causes the lead screws 48 to rotate a corresponding amount in the opposite angular sense to lower the roller 24. The gear box 56 includes, e.g. a meshing worm gear and worm wheel or similar locking mechanism which prevents the weight of the roller, together with machine vibration from causing the roller 24 to slowly self-lower when maintaining height is wanted. In the instance depicted, a pointer 60 is provided on one of the beams 34 and juxtaposed on a scale 62 provided on a vertical member 64 of one of the frame yokes. The scale 62 may be calibrated in desired units, e.g. to indicate thickness of the gap 66 between an imaginary plane tangent to the bottom of the roller 24 and the upper surface 68 of the horizontal run 16 of the conveyor belt 18. Where the machine 10 is dedicated to making patties of a consistently constituted product, e.g. ground beef of a predetermined substantially uniform temperature, fat content, roughness of grind, moisture content and degree of compaction, the scale 62 may additionally or alternatively read in individual patty weights, e.g. so that appropriate turning of the handwheel 58 can vary the setting from one-third pound patties to one-quarter pound patties.

The endless conveyor belt 18 preferably is made of cold-flexible, imperforate, smooth outer-surfaced, synthetic plastic sheet material FDA and USDA approved for use in contact with food. A preferred useful material is polyvinylchloride, e.g. a Voltra belt available in the U.S. from Sparks Manufacturing Company. The preferred belting is approximately 3/16 inch thick and thirty inches wide.

The belt 18 is shown being entrained about rolls 70, 72 at the upstream and downstream ends of its upper run 16 and driven by a tensioner roll 74 engaged with its inner surface 76 in the trough of a U-shaped loop 78 in the return run 80. The loop 78 is defined by the roll 74 and by the idler rolls 82.

The apparatus 10 is shown driven by an electrically powered variable speed motor 84 mounted to the frame 22. A drive belt 86 is shown drivingly connecting the motor 84 to the drive roll 74 of the conveyor belt 18. A mechanical power transmission 88 is also shown mounted to the frame 22 and arranged to have its input pulley 90 driven by an endless belt 92 from the motor 84. The output pulley means 94 of the transmission 88 is shown providing driving power to the primary compression roller 24 via an endless belt 96 entrained about the pulley means 94 and about a pulley means 98 mounted on a trunnion of the roll 24. If the preliminary compression roller 28 is provided and designed to be driven, it may be driven in reference to the primary compression roller 24 by means of an endless drive belt 100 entrained about the pulley means 98 and about a pulley 102 fixed on an axle of the preliminary compression roll 28.

A cutter assembly 104 is shown mounted on the frame 22 at 104 astride the upper run 16 of the conveyor belt 16, downstream of the primary compression roll 24. The purpose of the cutter assembly is to die the sheet of ground meat GBS passing under it into a regular pattern of hexagonal patties P flanked by a left selvage strip LS and a right selvage strip RS.

The assembly 104 is a modular unit which may easily be removed and replaced as a whole, e.g. for cutting patties of a different width, or for more convenient repair/exchange/replacement of the unit or any of its parts without protracted disruption of operation of the machine 10.

The cutter assembly 104 is shown comprising a subframe 106, mounted to the main frame of the machine 10, e.g. by four individual height-adjustment screws 107 for leveling the cutter assembly 104 relative to the upper surface of the upper 16 run of the conveyor belt 18 at a proper height such that at the cutting site, the cutters (to be described below) extend fully through the sheet of ground meat GBS, to barely engage the conveyor belting 18 without unduly scarring or impressing the material of the belting.

The sub-frame 106 includes vertical left and right side plates 108. Toward the upstream and downstream ends of the plates 108, respective pairs of bearings 110, 112, are mounted for trunnions 114, 116 of sprockets 118, 120 for respective endless drive chains, e.g. conventional roller chains 122, 124. For structural bracing two additional pairs of bearings 126, 128 are mounted in the side plates 108 respectively equally slightly upstream and downstream of halfway between the and somewhat below bearing pairs 110, 112. These bearing pairs respectively mount the trunnions 130, 132 of sprockets 134, 136. Accordingly, the endless chain 122 is entrained about the sprockets 118 and 120 at the left and the endless chain 124 is entrained about the sprockets 118 and 120 at the right with driving engagement of the chains with the further sprockets 134 and 136 serving to reduce or prevent vertical play in the lower runs of the chains 122, 124 at least in their respective segments between sprockets 134 and 136.

For wide machines, one or more sets of additional sprockets 119, 121, 135, 137 may be provided, e.g. medially of the machine, with a roller chain 123 entrained about them.

A drive pulley 138 is shown mounted on the trunnion 114 and drivingly connected by an endless belt 140 to the output pulley means 94 of the mechanical transmission 88 of the drive motor 84 for coordinatingly timed operation of the cutter assembly 104 in relation to advancing of the conveyor belt 18 carrying the sheet of ground meat GBS.

Each of the side plates 108 is shown provided on its inner face 142 with a cam track 144. The tracks 144, which are mirror images of one another, may be continuous and generally oval in form, or they may be generally recumbent C-shaped (open upwards), partly depending upon whether the cam tracks 144 are defined as grooves cut in the plates 108 or between rails 146 secured to the plates (the latter alternative being preferred, for ease of repair and refurbishing). In any event, it is the lower arc of the cam tracks, particularly in the vicinity of and below the central sprockets 134, 136 where the most useful effort is made by these structures.

To the endless roller chains 122, 123, 124, a plurality of similar cutter bars 148 are mounted, each to corresponding of links by connectors 149. Each cutter bar 148 is shown constituting an assembly of a hanger bar 150, a channel member 152 and a cutter die 154, secured together, e.g. by bolts 156. Each hanger bar is shown being constituted by a cutter die mounting plate 158, e.g. made of 304 stainless steel plate 0.375 inch thick, 29.375 inches wide (transversally of the machine), and 2.0 inches long (longitudinally of the machine). To the back of the plate 158 three ear-like hanger flanges 160 are shown secured, e.g. by welding, to extend perpendicularly to the plane of the plate. One of the flanges 160 is located along the median of the plate 158, and the other two near but not at the ends (e.g. each centered 11.375 inches from the median). Each hanger flange 160 is shown provided with a horizontal opening 162 through its thickness, running transversally of the machine. At its left and right ends, the back of each hanger bar cutter die carrier plate 158 is shown provided with a cam follower mounting strut 164 which projects in a plane which is perpendicular to the plane of the plate 158, but on an axis which extends at an angle of, e.g. sixty degrees to the plane of the plate. A cam follower roller 166 is rotatably mounted adjacent the lateral face 168 of each strut 164, e.g. by being journalled for rotation on a stub axle pin 170 which is secured at 172 in a corresponding opening 174 formed in each strut 164 distally of the plate 158 so as to extend horizontally, transversally of the machine 10. Each cam follower roller 166 is constructed and arranged to be confined in and guided by the respective cam track 144 on the side plates 108.

According to one embodiment of the invention, as is disclosed with reference to FIGS. 6 and 7, each cutter die 154 is constructed and arranged widthwise of the machine to alternately form a full and two adjoining half patties of regular hexagonal outline e.g. spaced on four inch centers lengthwise of the machine. (This requires that the roller chains 122, 123, 124 have an appropriate pitch so as to provide for cutter bar attachments at regular intervals, in this instance spaced four inches apart along the chains. Other sizes and spacings are possible, using roller chains and sprockets of different pitch where necessary.) In this instance the patty dyeing track comprising the roller chains and cutter bars includes twenty-one cutter bars.

The embodiment shown in FIG. 8 is very similar, except that each cutter bar is one-half the length (longitudinally of the machine), so that twice as many are needed, mounted at two inch intervals, (for making four inch-long regular hexagonal patties), with each cutter die 154' being configured widthwise of the machine to alternatingly form alternate halves of patties, i.e. leading half, trailing half, leading half, etc. On alternate dies 154', the pattern is shifted transversally by one patty width, so that alternating dies 154' are not identical, but are mirror images about the abutting edges of their bars. (Other comparable features in FIG. 8 are given correspondingly primed numerals as designators.) The FIG. 8 construction is preferred for ease of separation of the patties from the dies. However, more attention to close tolerances is needed in manufacturing of the cutter assembly 104 when such all half-cell bars are to be used, so the inventors have a divided preference: preferring the FIG. 8 version where a reliable close-tolerance machine shop is available, but otherwise for the FIGS. 6 and 7 version.

Each cutter die 154 is shown comprising a flat rectangular sheet 176 of stainless steel, e.g. 25.375 inches wide by 4.0 inches long by 0.250 inches thick. On the outer face 178 of the sheet, extending perpendicular to the face 178 are die walls 180, e.g. made of 14 gauge stainless steel welded at the base to the sheet 176, so as to stand out e.g. 2.0 inches to the cutting edge 182, which preferably is flat or only slightly beveled. In the instance of the embodiment shown in FIGS. 6 and 7, the die walls 180 constitute an array of regular transversally spaced four-cornered, five-sided (sixth, trailing-side 184 open) member having two adjacent corners 186, 188 and one side disposed flush with the leading edge 190 of the sheet 176, the two ends 192, 194 (with the open side 184 between them) disposed flush with the trailing edge 196 of the sheet 176, and the two corners 198, 200 located on an imaginary center line extending transversally of the sheet 176 half-way between the leading edge 190 and the trailing edge 196. Each of the five sides 202 and the open side 184 of each hexagonal figure is of equal length corner to corner, corner to end or end to end, respectively. Between each two neighboring, spaced hexagonal figures on the same cutter die 154, the die walls include a single side 204 which extends between two corners 198, 200 on said imaginary centerline. Accordingly, full cells are defined at 206, leading half-cells at 208 and trailing half-cells at 210. Centrally of each full cell 206, the sheet 176 is shown provided with a hole 211 through which a bolt may be inserted for securing each cutter die to a respective hanger bar, with a respective channel member 152 sandwiched between them. Other types of connectors could be used. Each channel member 152 is preferably formed of ultra-high molecular weight polyethylene to be of squared-U-shaped profile with a flat base 212 and opposed legs 214. The outer faces 216 of the legs 214 are flat and flush with the leading and trailing edges of the respective sheets 176. In some instances the channels 152 could be omitted, with the cutter dies being mounted directly to the hanger bars, but use of the channels 152 is preferred, inasmuch as abutment of leading and trailing faces 216 of respective neighboring trailing and leading cutter bars as the sheet of ground meat GBS is being cut into patties P assists the cam/cam follower interaction in maintaining the adjoining cutter bars squarely and levelly in abutment. Accordingly, as the ground meat is being cut, the open sixth side of each five-sided/one open side cell is closed by the leading edge side of the die wall of a similar cell on a neighboring cutter bar, and each three-sided/three open-sided leading or trailing half-cell is complementarily completed by the three-sided/three open-sided trailing or leading half-cell of a neighboring cutter bar, so that the ground meat sheet at the cutting station "sees" only regular six-sided regular hexagonal cells.

At the cutting station, the machine frame includes a rigid bed plate 217 supporting the upper run 16 of the conveyor belt 18 where the cutter dies press against it.

The horizontal lower central portion 218 of each cam track preferably is approximately 1.5 times as long as the space between centers of patty-cutting cells in the same column longitudinally of the machine, e.g. six inches for cells on four inch centers, and the decline and incline of the cam tracks coming into and out of that flat region preferably is about 7°. Because the substantially vertical descent of the cutters into the meat is gradual, excess compression and fracturing of patty peripheral portions is avoided.

At the downstream end of the cutter assembly, as the cutter bars are successively rotated up out of the sheet of ground meat which they have cut into patties and selvage, the patties remain on the conveyor upper rim 16, self-separating from the cutters as the cutter bars move apart as they round the downstream sprockets. If necessary a mechanical or air blast knock out assists may be provided as is known e.g. in the plastic cup vacuum thermoforming art. At this stage, the selvage strips LS and RS (which may be continuous strips or discrete pieces), drop away to the left and to the right of a transfer deadplate 220 e.g. into a recycling conveyor system 222 which takes the recovered material back to the input hopper, as shown in FIG. 2. The meat patties continue over the transfer plate 220 to a take-away conveyor 224 e.g. to be frozen in a blast freezer 226, and packed. Where freezing is not required, the take-away conveyor 224 may lead directly to a packing station, a further processing station, or to a cooking line.

By preference, the transfer plate 220 is foraminous as at 228 and tilted as shown, and constitutes the upper wall of an enclosed chamber 230 which is provided with blown, if not compressed, air e.g. by blower 232 at a sufficient velocity to so tend to levitate the patties that they do not rest on the plate 220, but, being pushed from behind by succeeding patties, glide on a layer of air over the plate 220 and onto the take-away conveyor 224. In effect, the system including the plate 220 acts as a fluidized bed transfer plate.

The machine 10 is designed so that where economically feasible, it may be run substantially continuously for the maximum time consistent with governmental sanitation regulations, e.g. up to eighteen hours. Because the machine 10 is so open, in contrast to slotted plate-type patty making machines, cleaning with a minimum amount of disassembly is possible.

Although the machine 10 has been described as if making hamburger patties from ground beef were its only use, in actual practice, it may be used to similarly make patties of other foods from pork sausage patties to granola bars to moist texturized vegetable protein patties for people and animals, to similar non-food patties.

Although the machine 10 provides a somewhat larger tolerance of patty to patty weight, e.g. up to about one-fourth ounce, plus or minus, for a six ounce patty, there are many applications where, given the vastly improved appearance and texture of the patties, such variation is quite acceptable, especially where a box of such patties can be expected to contain a fairly precise net weight of patties.

Although the orientation of the cutter assembly as depicted is preferred, it will operate satisfactorily if reversed end-for-end, provided the track of cutters is still driven towards downstream at the speed of the conveyor run 16.

As explained above, patty weight is easily varied by varying the thickness of the sheet of ground meat, e.g. for producing a run of six ounce patties and then a run of eight ounce patties on the same machine without needing to exchange any equipment, in contrast to slotted plate type hydraulic molders.

It should now be apparent that the method and apparatus for forming meat patties having a closer-to-hand-formed appearance and texture as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A process for forming ground beef patties having a close-to-handformed appearance and texture, comprising:
   grinding beef having a fat content of approximately 22 percent into a loose columnar collection of individual visible strands, through grinder openings 3/32 to ⅛ in inch in diameter, this collection having a bulk transverse cross-sectional area of at least about fifty square inches and a temperature of 28°-31° F.;
   providing a forwardly moving, upwardly presented, at least generally horizontal conveyor surface;
   over an extended period of time, continuing to deposit successive increments of said column onto the moving conveyor surface at an upstream hopper site, these increments being distributed widthwise of the moving conveyor surface, to a width at least equal to that needed for fully constituting patties at a downstream patty cutting site;

at a sheet-forming site located downstream of said hopper site, rollingly compressing the ground beef against the moving conveyor surface to provide a sheet of substantially even thickness widthwise of the moving conveyor surface, such thickness being substantially equal to the desired thickness of each patty in a run of patties;

operating at least one transversally extending individual cutter bar in such juxtaposition with the moving conveyor surface at a patty cutting site located downstream of the sheet-forming site that die walls provided on each said at least one cutter bar divide a respective longitudinally succeeding increment of said sheet of ground beef along substantially the full width thereof, with the possible exception of two laterally opposite marginal portions of minor extent, against said moving conveyor surface, into a plurality of at least substantially separate patties of substantially uniform shape and weight within said run, which patties are close to handformed in appearance and texture, and include noticeable strands of ground beef.

2. The process of claim 1, wherein:
said step of operating at least one transversally extending individual cutter bar is constituted by operating a longitudinally elongated endless track of flexibly interconnected transversally extending individual cutter bars.

3. The process of claim 2, wherein:
at said patty cutting site said die walls are led substantially vertically down into said sheet at a cam slope angle of approximately 7 degrees to horizontal, are brought into flatwise lower edge abutment with said moving conveyor surface over a length that is at least as long, longitudinally of said moving conveyor surface, as each said patty being produced in said run, and then led substantially vertically up out of the resulting array of substantially separate patties at a cam slope angle of approximately 7 degrees to horizontal.

4. The process of claim 3, wherein:
the die walls are oriented to cut patties of regular hexagonal shape.

5. The process of claim 4, wherein:
in operating said endless track each cutter bar is abutted with an upstream neighbor and a downstream neighbor while said flatwise lower edges are in lower edge abutment, in such a manner as to form each patty partly by at least one die wall on one cutter bar and partly by at least one die wall on a neighboring said cutter bar.

6. The process of claim 5, wherein:
at least some of said patties are half-formed by the die walls on one cutter bar and half-formed by the die walls on a neighboring said cutter bar.

7. The process of claim 6, wherein:
all of said patties are half-formed by the die walls on one cutter bar, half are half-formed by the die walls on an upstream neighboring said cutter bar, and half are half-formed by the die walls on a downstream neighboring said cutter bar.

8. The process of claim 6, wherein:
half of said patties are fully formed except for one side by the die walls on one cutter bar, with the remaining side of each of those patties each being formed by a die wall on a neighboring said cutter bar; and the other half of said patties are half-formed by the die walls on one cutter bar and the other halves of those patties are formed half by the die walls on an upstream neighboring said cutter bar and half by the die walls on a downstream neighboring said cutter bar.

9. The process of claim 1, wherein:
said distributing is performed by rolling a roller against the ground food product in said hopper.

10. The process of claim 1, wherein:
said distributing is performed by laterally shifting a grinder depositing head widthwise of the moving conveyor surface over said hopper as ground food product drops therefrom onto said moving conveyor surface.

11. The process of claim 1, wherein:
at said sheet forming site, said ground food product is rollingly compressed into said sheet by being passed under a roller having an adjustably selected height relative to said moving conveyor surface.

12. The process of claim 11, further comprising:
upon completing said run, adjusting the height of said roller relative to said moving conveyor surface to produce a sheet of different uniform thickness, and thereafter continuing to move said conveyor surface, deposit increments of said ground food product at said hopper site, distribute those increments, provide said sheet and operate said endless track, in order to produce a consequently further run, a plurality of substantially separate patties of substantially uniform shape and weight, such shape being similar to that of the patties produced in the preceding run, but the patty weight being different due to the difference in sheet thickness.

13. The process of claim 1, further comprising:
creating a fluidized bed at the downstream end of the moving conveyor surface for floating the patties off the moving conveyor surface.

14. The process of claim 13, further comprising:
juxtaposing a take-away conveyor with the output end of the fluidized bed for carrying away the patties transferred from the moving conveyor surface.

15. The process of claim 14, wherein:
the fluidized bed is narrower than the moving conveyor surface by an amount sufficient to permit any non-patty selvage to drop away for reclamation without being transferred to said take-away conveyor.

16. The process of claim 1, wherein:
said die walls are oriented to cut patties of regular hexagonal shape.

17. The process of claim 16, wherein:
in each successive division of an increment of said sheet by said at least one cutter bar, at least one patty only partially divided by said at least one cutter bar from a respective preceding increment, has the remainder thereof divided from said sheet, so that each respective at least one patty is divided from two successive increments of said sheet by said at least one cutter bar.

18. The process of claim 1, further comprising:
effectively juxtaposing with the downstream end of said moving conveyor surface a take-away conveyor which is narrower than said moving conveyor surface by an amount sufficient to permit any non-patty selvage to drop away for reclamation without being transferred to said take-away conveyor.

* * * * *